(12) United States Patent
Annampedu et al.

(10) Patent No.: US 7,002,767 B2
(45) Date of Patent: Feb. 21, 2006

(54) DETECTION OF RECORDED DATA EMPLOYING INTERPOLATION WITH GAIN COMPENSATION

(75) Inventors: Viswanath Annampedu, Schnecksville, PA (US); Pervez M. Aziz, Dallas, TX (US)

(73) Assignee: Agere Systems Inc., Allentown, PA (US)

( * ) Notice: Subject to any disclaimer, the term of this patent is extended or adjusted under 35 U.S.C. 154(b) by 265 days.

(21) Appl. No.: 10/676,560

(22) Filed: Sep. 30, 2003

(65) Prior Publication Data

US 2005/0068650 A1 Mar. 31, 2005

(51) Int. Cl.
G11B 20/10 (2006.01)
(52) U.S. Cl. ............... 360/75; 360/46; 360/77.04; 369/47.25; 375/341; 375/345
(58) Field of Classification Search ............... None
See application file for complete search history.

(56) References Cited

U.S. PATENT DOCUMENTS

| | | | | |
|---|---|---|---|---|
| 5,835,295 | A * | 11/1998 | Behrens | 360/51 |
| 5,966,258 | A * | 10/1999 | Bliss | 360/46 |
| 6,462,686 | B1 * | 10/2002 | Asano et al. | 341/143 |
| 6,538,834 | B1 * | 3/2003 | Asano | 360/46 |
| 6,778,345 | B1 * | 8/2004 | Ozdemir | 360/67 |
| 6,867,941 | B1 * | 3/2005 | Ozdemir | 360/46 |
| 6,912,099 | B1 * | 6/2005 | Annampedu et al. | 360/46 |
| 2003/0053245 | A1 * | 3/2003 | Ozdemir | 360/77.08 |
| 2003/0067998 | A1 * | 4/2003 | Nakajima et al. | 375/341 |
| 2003/0137765 | A1 * | 7/2003 | Yamazaki et al. | 360/39 |
| 2004/0136477 | A1 * | 7/2004 | Annampedu et al. | 375/340 |

* cited by examiner

*Primary Examiner*—David Hudspeth
*Assistant Examiner*—James L Habermehl (57) ABSTRACT

A repeatable run-out (RRO) detector employs one or more digital interpolators to interpolate asynchronous sample values representing an RRO address mark (AM) and RRO data, and an asynchronous maximum-likelihood (AML) detector to detect the RRO AM. The AML detector selects one of either the asynchronous or interpolated sample sequences that are closest in distance to the ideal RRO AM sample sequence. In addition, a gain value is generated for each of the asynchronous and interpolated sample sequences. Once the RRO AM is detected, the AML detector provides a RRO AM found signal. Gain estimate values for either the selected asynchronous or selected interpolated sample sequences corresponding to the RRO AM found signal are averaged over a predefined number of detection events to generate a best gain error metric (BGEM). The BGEM is employed to adjust the gain of the asynchronous sample sequence.

45 Claims, 7 Drawing Sheets

DETECTION OF RECORDED DATA EMPLOYING INTERPOLATION WITH GAIN COMPENSATION

CROSS-REFERENCE TO RELATED APPLICATIONS

This application is related to U.S. patent application Ser. No. 10/436,526, filed May 13, 2003 as the teachings of which are incorporated herein by reference.

BACKGROUND OF THE INVENTION

1. Field of the Invention

The present invention relates to detection of data in a communications system, and, more particularly, to detection of servo repeatable run out (RRO) information from a channel.

2. Description of the Related Art

A Read channel integrated circuit (IC) is a component of a modem hard disk drive, such as a hard disk drive found in many PCs. A Read channel component converts and encodes data to enable the (e.g., magnetic) recording head(s) to write data to the disk and then read back the data accurately. The disks in a hard disk drive typically include many tracks containing encoded data, and each track comprises one or more of user (or "read") data sectors as well as "servo" data sectors embedded between the read sectors. The information of the servo sectors aids in positioning the magnetic recording head over a track on the disk so that the information stored in the read sectors may be retrieved accurately.

Repeatable run out (RRO) refers to a phenomenon that occurs due to an imperfect spindle upon which the disk rotates. An imperfect spindle might not allow the disk in the hard drive to spin properly at the disk's center. If the disk is not rotating at the center, then the track rotating under the head will not follow a circular trajectory, and hence the head might not be able to read the servo information properly. A similar phenomenon occurs when spindle imperfections were present at the time the servo information was written to the disk. Even though the disk may spin properly in a different hard disk drive while reading the servo information, since the information was not written properly on a circular track, the head might not be able to read the servo information accurately. Thus, there is a need for a mechanism to properly guide the head to follow the trajectory of the track. A RRO data field in the servo information serves this purpose.

Figure 1A:
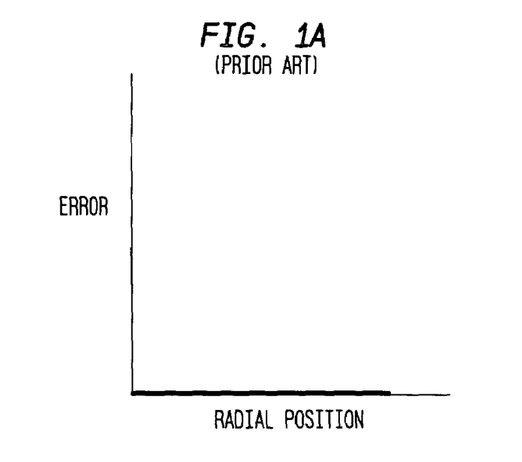
FIG. 1A shows radial position versus error of a head following a trajectory over a rotating disk when the error is zero.
Figure 1B:
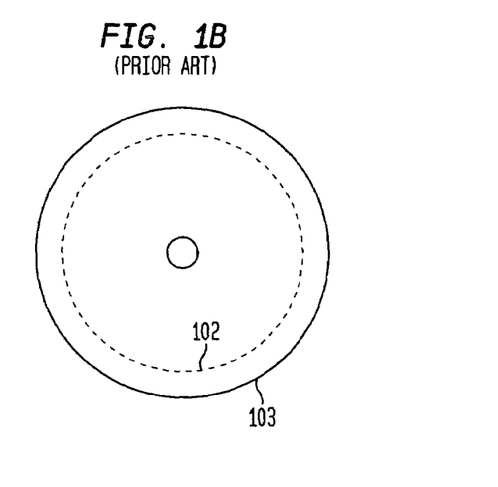
FIG. 1B shows the head tracking a circular trajectory for the graph of FIG. 1A.
Figure 1C:
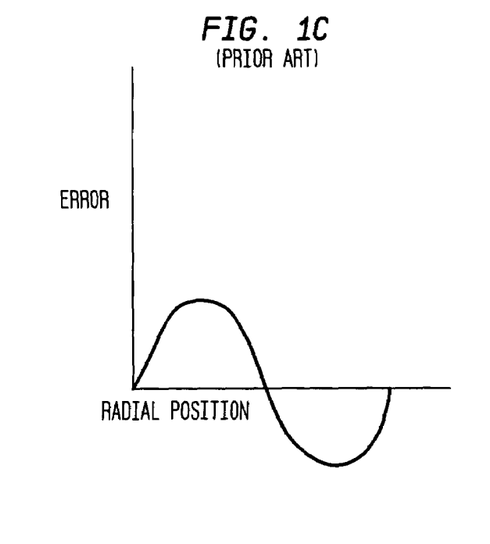
FIG. 1C shows radial position versus error of a head following a trajectory over a rotating disk for varying error that returns to zero after one revolution of the disk.
Figure 1D:
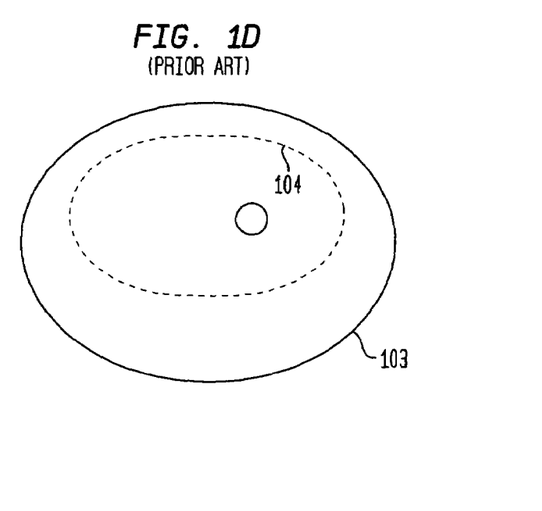
FIG. 1D shows a head tracking an oval path for the graph of FIG. 1C.

FIGS. 1A–1D illustrate one form of RRO (termed a one "f" run out) that results from an imperfect spindle. FIG. 1A shows radial position versus error when the error is zero, corresponding to the head tracking in a circular trajectory as shown by the dashed circle 102 on disk 103 of FIG. 1B. As shown in FIG. 1C, the error for one "f" run out varies as a function of the radial position, but the error at a given position repeats after one revolution of the disk. As shown in FIG. 1D, the one "f" run out results from the head tracking an oval path, shown by the dashed path 104 on disk 103. Since the error "repeats" itself from one revolution to another, techniques may be devised to compensate for the problem. By feeding positioning information about the "repeatable" error to servo control circuitry, the error may be corrected to position the head properly over the servo track. State of the art magnetic recording systems employ digital signal processing to detect servo data as opposed to older systems employing analog techniques.

Figure 2:
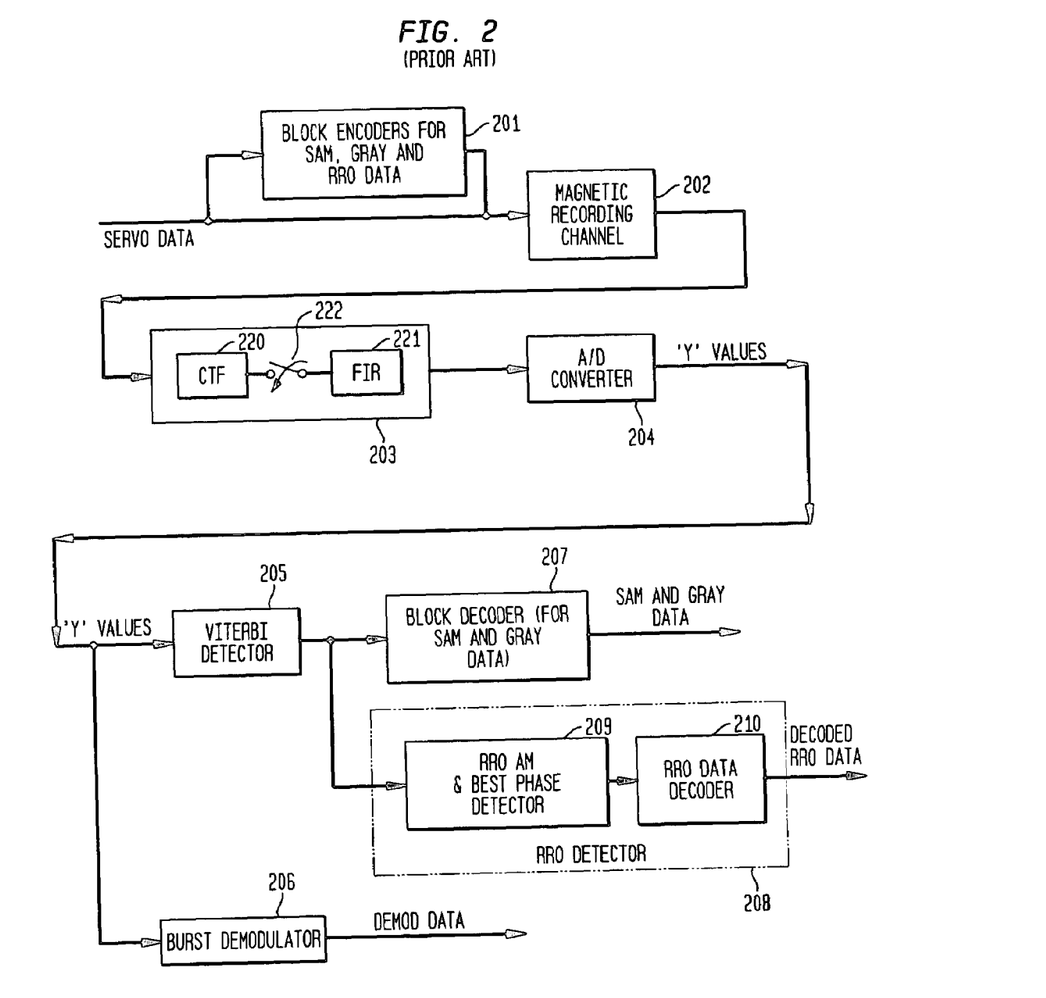
FIG. 2 shows a conventional magnetic recording system of the prior art.

FIG. 2 shows a conventional magnetic recording system of the prior art. Servo data is encoded by block encoders 201. Block encoders 201 may represent several different encoders associated with different fields of the servo data. The encoded servo information is written to the disk (or other recording medium) as servo sector information.

Figure 3:
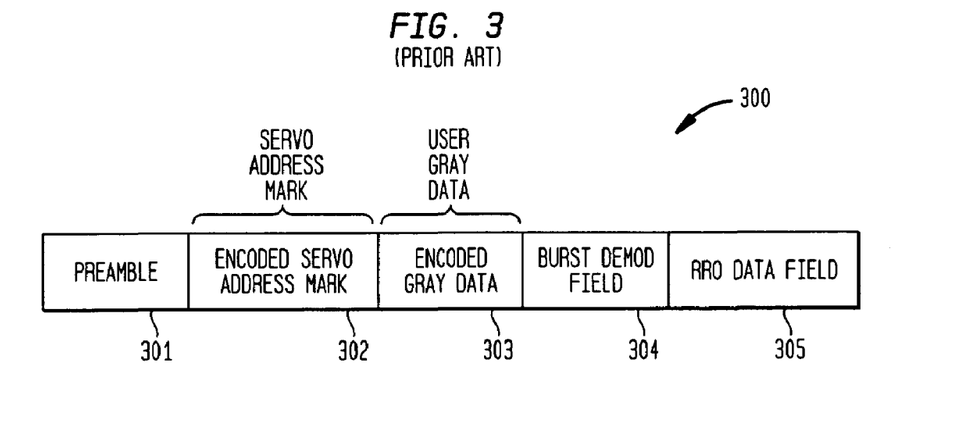
FIG. 3 shows a format for servo sector information employed with the magnetic recording system of FIG. 2.

FIG. 3 shows the format of servo sector information 300. The servo sector information 300 comprises preamble 301 (e.g., a 2T pattern) that allows the system to recover the timing and gain of the written servo data. Preamble 301 may be followed by encoded servo address mark (SAM) 302, which is generally an identical identification address (fixed number of bits) for all servo sectors. SAM 302 may then be followed by encoded Gray data 303. Gray data 303 represents track number/cylinder information and may be employed as coarse positioning information for the magnetic head. Gray data 303 is followed by one or more burst demodulation fields 304. Burst demodulation fields 304 are employed as fine positioning information for the head over the track. Burst demodulation fields 304 are followed by RRO data field 305. Information in RRO data field 305 provides head positioning information to correct for RRO, which information is finer than that provided by the Gray data and coarser than that provided by the burst demodulation fields.

Figure 4:
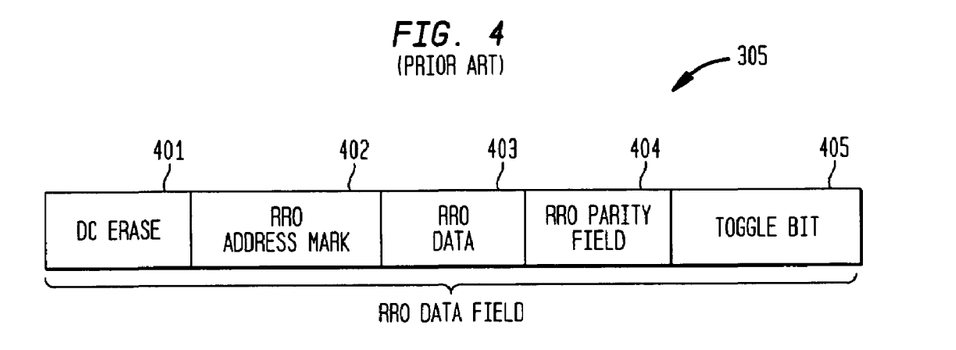
FIG. 4 shows the format of the repeatable run out (RRO) data field of FIG. 3.

The format of RRO data field 305 is shown in FIG. 4. RRO data field 305 begins with DC erase 401, which is a predefined pattern that is generally either an all-zeros or an all-ones pattern. DC erase 401 is followed by RRO address mark (AM) 402, which is a bit pattern that is the same for all servo sectors. RRO AM 402 indicates when to start decoding RRO data and aids selection of the best sampling phase for decoding RRO data 403. RRO AM 402 is followed RRO data 403, which includes head-positioning information. RRO data 403 is followed by parity field 404, which includes parity bits employed for error detection/correction. Parity field 404 is followed by toggle bit 405, which brings the magnetization level back to whatever magnetization level the disk used in DC erase 401.

The servo preamble, SAM, Gray data, and burst demodulation fields are typically written by a servo track writer. However, the RRO data field following the last burst demodulation field is typically written by the read channel component. For detecting the servo preamble, SAM, Gray data, and demodulation fields, a digital phase-locked loop (DPLL) acquires the proper sampling phase based on the timing information provided by the preamble. However, for RRO detection, it is not desirable to write a preamble for format efficiency reasons. Hence, a detector does not know a priori the proper sampling phase (timing) to read the RRO information. Thus, reading RRO information is an "asynchronous" data detection process. Also, detection of the RRO address mark is prone to detection errors because the RRO detector may begin detection in the DC erase field without the proper sampling phase (i.e., there is no preamble to guide the timing loop). The number of detection errors increases when fewer bits are written as the RRO address mark for format efficiency reasons.

Returning to FIG. 2, the encoded servo information is read back by a magnetic recording head. Together, the process of writing to, storing on, and reading from the disk by the recording head may be modeled as magnetic recording channel 202. Data read from the disk is referred to as readback data. The readback data is equalized to a desired target partial response by equalizer 203 comprising continuous time filter (CTF) 220 followed by discrete time, finite impulse response (FIR) filter 221. Sampling of the signal from CTF 220 (shown in FIG. 2 by switch 222) is synchronous using the timing information from a DPLL (not shown in FIG. 2) when servo SAM, Gray, and demodulation burst data are read, but is asynchronous when RRO data is read. The output of equalizer 203 is digitized and quantized by A/D converter 204, whose output is shown as 'Y' values.

The Y values are applied to Viterbi detector 205, which is a partial-response maximum-likelihood (PRML) detector. Constraints imposed by the servo encoder of block encoder 201 may be employed in the design of the Viterbi detector to decode the servo data optimally. The output of Viterbi detector 205 is applied to block decoder 207 to generate decoded SAM and Gray data. The output of Viterbi detector 205 (which Viterbi detector might employ a pruned trellis to enforce the coding constraints of the RRO encoder) is also applied to RRO detector 208. RRO detector 208 includes RRO address mark (AM) & best phase (BP) detector 209, which detects the RRO address mark and simultaneously detects the BP. RRO data decoder 210 of RRO detector 208 employs the RRO AM and the BP to select samples for decoding into RRO data. The 'Y' values are also passed on to burst demodulator 206 to generate fine positioning information for the head over the track.

Other detectors employed for detection of servo information include peak detectors. In peak detectors, location and polarity of the peak (which are dependent on servo encoder constraints) serve to enable decoding of the data. The output of the peak detector may also be fed to an RRO detector for detecting the RRO information. Both peak and Viterbi detectors give very good performance when they use properly sampled signals for detecting the bits. The performance of these detectors degrades significantly when the samples are generated with timing errors.

An RRO encoder (such as included in block encoders 201) might transform each one-bit value of the RRO data into 3-bit values by repeating the one-bit value three times (i.e., "1" goes to "111" and "0" goes to "000"). If the constraint that no two transitions are adjacent is imposed on detection of encoded RRO data (termed a d=1 constraint and often employed for non-return-to-zero (NRZ) line coding), the trellis employed by Viterbi detector 205 is pruned to enforce this constraint (i.e., the constraint that neither "010" nor "101" bit patterns are allowed within the output bit stream of the Viterbi detector).

Since the sampling phase is not known when reading the RRO data field, a Viterbi detector is more prone to making errors. Due to the imposed d=1 constraint, only certain type of errors are possible. Since each bit is written thrice and because of the d=1 constraint in the Viterbi detector, the first and third bits are most likely to be affected, while the second (middle) bit is most likely to be preserved due to improper sampling phase. Identifying the middle bit detects the corresponding RRO data field. The RRO address mark is employed to identify which bits of the Viterbi detector output are the middle bits.

One technique of the prior art employed by RRO AM & BP detector 209 to identify middle bits, or the "middle phase" as the best phase, employs middle phase selection logic. For example, if 0101001 is the pattern used for RRO address mark, after encoding, this pattern becomes 000111000111000000111 (which is 21 bits). RRO sync and phase centering by detector 209 are accomplished by passing the data from the output of the pruned Viterbi detector through a sliding window. The data within the window is compared to the expected address mark for each phase of the bit (3T/bit, where T is the bit period). The RRO address mark is found when the number of mismatches is less than a threshold (or if the number of matching bits is greater than or equal to another threshold). For example, if no tolerance is allowed for errors in the read RRO address mark, then all 7 bits of the RRO address mark must match, and the threshold for the number of matching bits is set as 7. Phase centering (selecting which is the middle bit) is accomplished by evaluating the number of matches on adjacent phases.

Other techniques employ digital interpolation with bit peak detection to detect the series of peaks of the RRO AM on a peak-by-peak basis. One or more digital interpolators are employed to interpolate the asynchronous samples from the receiver's A/D converter to generate one or more interpolated samples in between the asynchronous samples. Thus, each digital interpolator generates an interpolated sample corresponding to some phase relative to that of the sample timing of the A/D converter. One aspect of interpolation employs a phase-locked loop with phase error detection to generate synchronous interpolated samples. Such method is described in U.S. Pat. No. 5,835,295 to Behrens, which is incorporated herein in its entirety by reference.

Since various RRO detectors search for peak values, these detectors employ ideal peak levels as a priori information for the detection process. However, the process of reading data from, for example, the recording media may introduce variations in the analog signal level. Variations in signal level, termed gain error, might result in a considerable difference between the ideal peak levels and observed peak levels when the RRO AM is found. Maximum likelihood detection suffers in performance when ideal peak levels are employed when searching for peaks in the presence of gain errors.

SUMMARY OF THE INVENTION

The present invention relates to data detection employing gain compensation with one or more digital interpolators to interpolate the asynchronous sample values into one or more interpolated sample sequences. One of either the asynchronous or interpolated sample sequences is selected that is closest in distance to an ideal sample sequence corresponding to, for example, a repeatable run-out (RRO) address mark (AM). In addition, a gain value is generated for each of the asynchronous and interpolated sample sequences. Once the RRO AM is detected, an RRO AM found signal is provided. Gain estimate values for either the selected asynchronous or interpolated sample sequences corresponding to the RRO AM found signal are averaged over a predefined number of detection events to generate a best gain error metric (BGEM). The BGEM is employed to adjust the gain of the asynchronous sample sequence.

In accordance with embodiments of the present invention, data is detected in a sample sequence read from a recording channel by the following. One or more interpolated sample sequences are generated from the read sample sequence, wherein each interpolated sample sequence has a different corresponding phase relative to the read sample sequence. A distance measure is generated between a portion of each sample sequence and an ideal sample sequence, wherein the ideal sample sequence corresponds to a sample sequence having peaks in the detected data. Gain error information is generated for the portion of each sample sequence; either the read sample sequence or one of the interpolated sample sequences is selected based on the minimum distance measures for use in detecting the data; and a best gain error metric (GEM) is generated for the selected sample sequence from the corresponding gain error information. The read sample sequence is adjusted based on the GEM.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

In accordance with exemplary embodiments of the present invention, a repeatable run out (RRO) detector of a receiver generates a gain adjustment value to compensate for variations in gain of an asynchronously sampled signal including RRO data. The receiver employs interpolation of the asynchronous sample sequence and generates gain estimates for both the asynchronous sample sequence and one or more interpolated sample sequences. The RRO detector selects best phase samples from the asynchronous sample sequence and one or more interpolated sample sequences to detect the RRO data. The RRO detector also generates a gain compensation value from the gain estimates for the best phase samples. Gain compensation values for several RRO data detection events are combined to generate a gain adjustment value. The gain adjustment value is then employed to adjust subsequent asynchronous sample sequences to improve RRO detection performance.

While the present invention is described for detection and decoding of encoded RRO data from a magnetic recording medium, the present invention is not so limited. One skilled in the art may readily extend the teachings herein to other forms of sampled data read from other types of recording media, such as optical recording media. In addition, while the following exemplary embodiments are described for asynchronously sampled servo RRO data detection, the techniques described herein may be employed for synchronously sampled servo RRO data detection as well.

Consequently, as an aid to understanding the present invention, RRO detection employing interpolation is first described with respect to an exemplary receiver, and then generation of a gain adjustment value in accordance with an embodiment of the present invention is described with respect to the exemplary receiver.

RRO Detection Employing Interpolation

Figure 5:
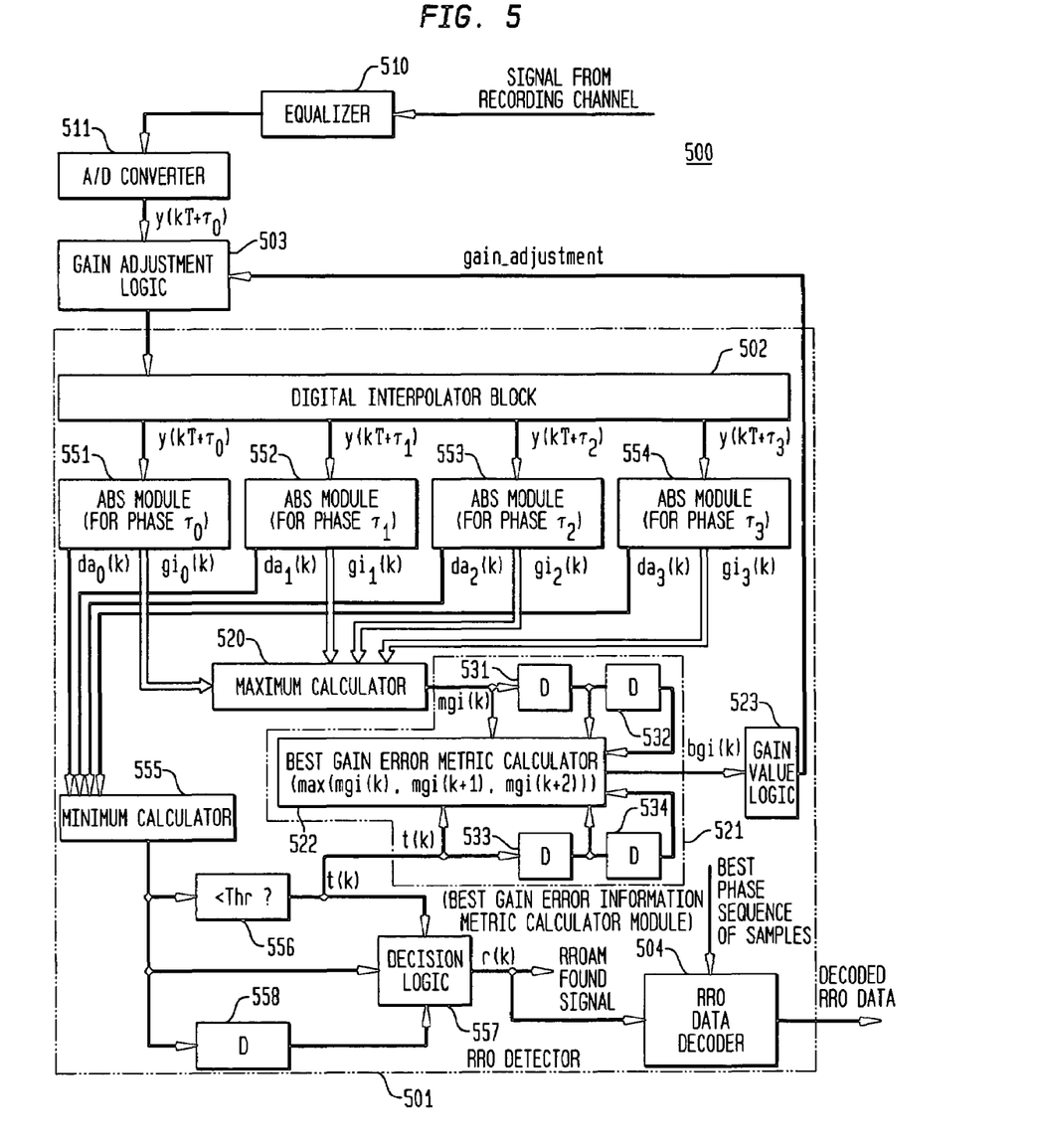
FIG. 5 shows a receiver including a repeatable run out (RRO) detector for detecting/decoding RRO data and employing gain compensation in accordance with exemplary embodiments of the present invention.

FIG. 5 shows a receiver 500 including an RRO detector 501 for detecting and decoding RRO data field information in accordance with exemplary embodiments of the present invention. RRO detector 501 may detect and decode RRO data field information such as shown in FIG. 4, including RRO address mark (AM) and RRO data. Receiver 500 further comprises equalizer 510 and analog-to-digital (A/D) converter 511. Equalizer 510 applies equalization to a signal read from a magnetic recording medium, such as a magnetic recording disk, to compensate for effects of inter-symbol interference (ISI) and signal dispersion caused by the signal's passage through the magnetic recording channel (medium). The signal may be a series of symbols representing servo data, such as encoded SAM, Gray, and RRO data as shown in FIGS. 3 and 4. Equalizer 510 may include a switch (not shown in FIG. 5) to enable sampling of the analog signal. A/D converter 511 generates digital samples at a symbol rate T from the equalized signal from equalizer 510. Sampling of the signal from equalizer 510 might be synchronous using the timing information from a digital phase-locked loop (DPLL, not shown in FIG. 5) when servo SAM, Gray, and demodulation burst data are read, but might be asynchronous when RRO data is read.

The asynchronous sample sequence from A/D converter 511 is shown as a sequence of 'Y' values (e.g., $y(kT+\tau_0)|_K$, where k is a integer representing a discrete time value and K is the length of the asynchronous sample sequence) input to RRO detector 501. The sequence of 'Y' values from A/D converter 511 represents asynchronous sample values having an arbitrary phase for the RRO data field information. The sequence of 'Y' values is applied to gain adjustment logic (GAL) 503, which applies a gain adjustment value gain_adjustment to the sequence of 'Y' values to scale the 'Y' values in accordance with the present invention, as described subsequently. Gain-compensated 'Y' values are then applied to RRO detector 501.

RRO detector 501 comprises digital interpolator block 502. Digital interpolator block 502 may comprise one or more digital interpolators, each interpolator interpolating the sequence of 'Y' values from A/D converter 511 to generate a corresponding interpolated sample sequence having a different phase from the phase of the asynchronous sample sequence. Digital interpolator block 502 provides M sample sequences (M a positive integer): the asynchronous samples from A/D converter 511 with phase $\tau_0$, and M−1 different interpolated sample sequences with phases $\tau_1$ through $\tau_{M-1}$, respectively.

RRO detector 501 detects the RRO address mark (AM) of the RRO data field (after the DC erase field) in one of the M sample sequences from digital interpolator block 502. RRO detector 501 employs an asynchronous maximum likelihood (AML) detection algorithm, such as a Viterbi algorithm, to detect the series of peaks of the RRO AM based on detection of the entire sequence of observed peaks, instead of on a peak-by-peak basis. AML detection of the RRO AM selects one of the M sample sequences from digital interpolator block 502 that is "closest" in, for example, Euclidean distance to the ideal RRO AM sample sequence. The relation "closest" may be expressed in different ways with respect to distance and a cost function, as described subsequently.

Once the RRO AM is detected, RRO detector 501 provides an RRO AM-found signal r(k) as well as the selected one of the M sample sequences having the best phase (i.e., provides the best samples for detecting and decoding the RRO data). Best phase selection is described in U.S. patent application Ser. No. 10/342,153 to Viswanath Annampedu and Pervez Aziz entitled "Asynchronous Servo RRO Detection Employing Interpolation," filed on Jan. 14, 2003, which is incorporated herein in its entirety by reference.

Based on the RRO AM-found signal r(k) and a priori information about the RRO encoder's coding constraints, RRO data decoder 504 decodes the selected one of the M sample sequences corresponding to the best phase into RRO data. Operation of digital interpolator block 502 is now described.

Digital interpolator block 502 receives, for example, four 'Y' values Y0, Y1, Y2, and Y3, which values are asynchronous samples from A/D converter 511 sampled at the symbol rate T. These samples need not correspond to peaks and/or zero crossings of the analog waveform input to A/D converter 511, and may be any samples that are spaced T apart in time. Using these four asynchronous samples, digital interpolator block 502 generates estimates for interpolated samples (e.g., Y11, Y12, and Y13). For example, the following filtering operations of equations (1) through (3) generate interpolated samples Y11, Y12, and Y13:

$$Y11=(-2*Y3+5*Y2+13*Y1-2*Y0)/16 \qquad (1)$$

$$Y12=(-2*Y3+9*Y2+9*Y1-2*Y0)/16 \qquad (2)$$

$$Y13=(-2*Y3+13*Y2+5*Y1-2*Y0)/16 \qquad (3)$$

Each of the filter operations represented by equations (1) through (3) is a digital interpolation. The term "16" in the denominator of equations (1)–(3) is a scaling term employed to adjust the interpolated samples values to be compatible with 6-bit sample values from the A/D converter. Compatible samples should resemble samples of an oversampled signal passed to the A/D converter. Other embodiments may scale the original read samples (e.g., the denominator of equations (1), (2), and (3) becomes "4", and samples Y0, Y1, Y2, and Y3 are scaled by 4 prior to interpolation). Digital interpolator block 502 may comprise one digital interpolation filter for each of the sampling points to be interpolated (i.e., one interpolator per equation), though separate serial processing may also be employed (e.g., one interpolator implementing all equations). The present invention is not limited to these forms of filtering operations described in equations (1), (2), and (3), and one skilled in the art may employ other types of interpolation to generate interpolated samples.

Figure 6:
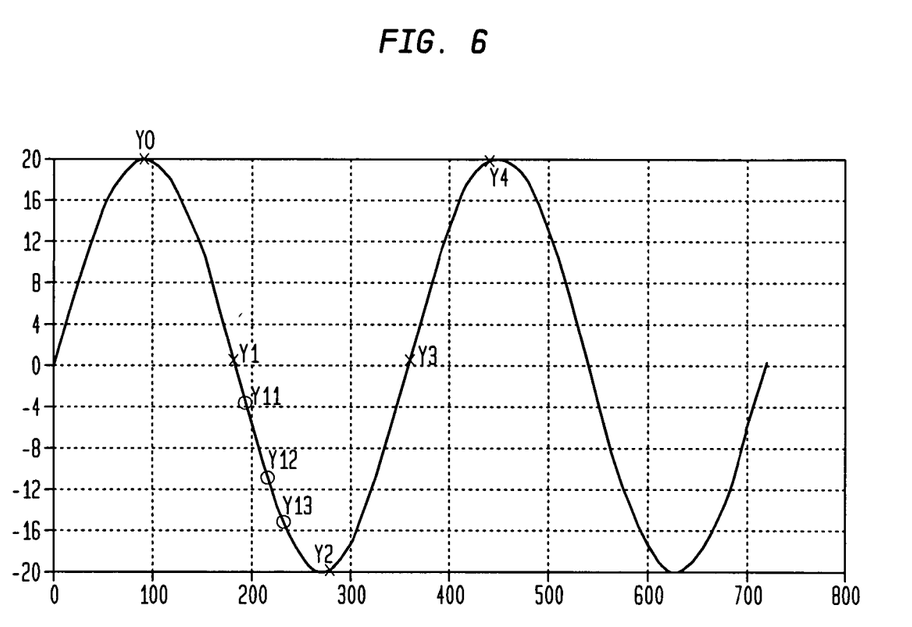
FIG. 6 shows a graph of a waveform including asynchronous sample points and interpolated sample points provided by the digital interpolator block of FIG. 5.

Interpolated sample Y11 corresponds to a sample that is spaced T/4 after the asynchronous sample Y1. Similarly, interpolated samples Y12 and Y13 are spaced T/2 and 3T/4 after Y1, respectively. Thus, if sample Y1 corresponds to a time kT, then sample Y11 corresponds to Y1(kT+T/4), sample Y12 corresponds to Y1(kT+T/2), sample Y13 corresponds to Y1(kT+3T4), and sample Y2 corresponds to Y1(kT+T). FIG. 6 (not drawn to scale) shows a graph of a waveform applied to the A/D converter including i) asynchronous sample points Y0=20, Y1=0, Y2=−20, and Y3=0 and ii) interpolated sample points Y11, Y12, and Y13. After accounting for inherent filter and implementation delays, digital interpolator block 502 generates a continuous stream of samples, which are T/4 apart from each other. Alternatively, over-sampling may be employed to generate a similar continuous stream of samples, but involves increasing the speed (clock frequency) of A/D converter 511 by four.

The present invention is not limited to samples spaced T/4 apart, and additional interpolators may be employed to estimate sample points at other sampling instances. For example, to estimate samples with a T/8 resolution (i.e., spacing between two samples is T/8), seven interpolators are employed to generate interpolated samples used in addition to the asynchronous samples from A/D converter 511. Possible filter coefficients for these seven digital interpolators are given in Table 1 below:

TABLE 1

| Interpolation at | Simple Digital Filters (Number of Taps: 4) | | | |
|---|---|---|---|---|
| T/8 | −1/16 | 2/16 | 15/16 | −1/16 |
| T/4 | −2/16 | 5/16 | 13/16 | −2/16 |
| 3T/8 | −2/16 | 7/16 | 11/16 | −2/16 |
| T/2 | −2/16 | 9/16 | 9/16 | −2/16 |
| 5T/8 | −2/16 | 11/16 | 7/16 | −2/16 |
| 3T/4 | −2/16 | 13/16 | 5/16 | −2/16 |
| 7T/8 | −1/16 | 15/16 | 2/16 | −1/16 |

The asynchronous sample sequence from A/D converter 511 and M−1 interpolated sample sequences are processed with an asynchronous maximum likelihood (AML) detection algorithm to detect the series of peaks of the RRO AM based on the entire sequence of observed peaks. The AML detection algorithm selects either i) the asynchronous samples from the A/D or ii) samples of one of the sets of interpolated samples that are "closest" in, for example, a distance measure to the ideal RRO AM sample sequence. The relation "closest" may be expressed in different ways with respect to the minimization of a cost function, such as minimized square of the Euclidean distance or minimized absolute value of distance, where the distance $e_m(k)$ between an observed sample y(k) and ideal sample $\hat{y}(k)$ at time k is as given in equation (4):

$$e_m(k)=(y(k)-\hat{y}(k)) \qquad (4)$$

For asynchronous sampling with period T, which is equivalent to the symbol period, the absolute value distance $ea_m(k)$ for one peak of the mth phase with respect to the phase of asynchronous samples at time k is as given in equation (5):

$$ea_m(k)=|y(kT+\tau_m)-\hat{y}(kT)|. \qquad (5)$$

A given implementation of the AML detection algorithm, as well as a given implementation of RRO data decoder 504, is based on the type of encoding employed by the RRO AM and RRO data encoder(s). For the RRO AM encoding, a given input bit may be repeated or translated to a codeword of length NT bits. In addition, the number B is defined as the total number of peaks in the RRO AM.

For example, if the RRO AM and data encoder is a ¼ encoder that receives an input bit and generates four output bits, such as the encoding: "0" becomes "0011" and "1" becomes "1100", then the peaks are spaced 4T apart. Thus, the sum $da_m(k)$ of the absolute value distances of the mth phase of sampling accounting for all B peaks spaced 4T apart is as given in equation (6):

$$da_m(k) = \sum_{b=0}^{B-1} |y(kT + \tau_m - 4Tb) - \hat{y}(kT - 4Tb)| \qquad (6)$$

The minimum summed absolute value distance is given in equation (7):

$$\min_{m,k} da_m(k) \qquad (7)$$

where $$\min_{m,k}$$

(●) is the mathematical minimum of "●" computed for all m sequence phases at time k.

A detector is generally designed to operate with a given performance level, which may often be related to a given probability of error in detected values. Consequently, for a given implementation, RRO detector 501 selects either the asynchronous sample sequence or one of the interpolated sample sequences provided that the minimized summed absolute value distance is less than a predefined threshold thr, as given in equation (8):

$$\min_{m,k} da_m(k), \text{ such that } da_m(k) < thr, \qquad (8)$$

where threshold thr might be determined through calculation or through observation of real and/or simulated systems. A variable t(k) is defined as a tentative address mark found signal. Initially, the variable t(k) is set to "0", and when $da_m(k) < thr$, the variable t(k) is set to "1".

For example, digital interpolator block 502 may employ three interpolators. Thus, m={0,1,2,3}, and digital interpolator block 502 provides four sample sequences with phases $\tau_m$: the asynchronous samples from A/D converter 511 with phase $\tau_0$, and three different interpolated sample sequences with phases $\tau_1 = T/4$, $\tau_2 = T/2$, and $\tau_3 = 3T/4$, respectively. RRO detector 501 evaluates expression (6) over all sample sequences, declaring a tentative RRO AM detection when expression (8) is true.

RRO detector 501 may or may not set the RRO AM-found signal r(k) based on the tentative decision. For some embodiments, the first occurrence of $da_m(k)$ falling below threshold thr might not correspond to a sample sequence of phase $\tau_m$ being the best phase sample sequence. Consequently, for some embodiments, RRO detector 501 evaluates equation (8) over all sample sequences during another clock cycle. The RRO AM-found signal r(k) is set based on the decision rule of equation (9):

$$r(k) = \begin{cases} t(k) & \text{if } da_{m_k}(k) \le da_{m_{k-1}}(k-1) \\ t(k-1) & \text{if } da_{m_k}(k) > da_{m_{k-1}}(k-1) \end{cases} \qquad (9)$$

where $m_k$ corresponds to the phase number of the minimum summed absolute value distance at time k, and $m_{k-1}$ corresponds to the phase number of the minimum summed absolute value distance at time k-1. As would be apparent to one skilled in the art, equation (6) may be modified to account for peaks that are more or less than 4T apart, as shown in the expression of equation (10):

$$da_m(k) = \sum_{b=0}^{B-1} |y(kT + \tau_m - S_b Tb) - \hat{y}(kT - S_b Tb)| \qquad (10)$$

where $S_b$ is the separation of the bth peak sample from the prior peak sample. For example, a peak separation of 5T (and $S_b = 5$) may be advantageous for enhanced detection of E2PR4 target channel responses.

Returning to FIG. 5, RRO detector 501 processes four sample sequences from digital interpolator block 502: the asynchronous samples ($y(kT+\tau_0)$) from A/D converter 511, and three different interpolated sample sequences ($y(kT+\tau_1)$, $y(kT+\tau_2)$, and $y(kT+\tau_3)$). RRO detector 501 processes the four sample sequences in accordance with the relations of equations (6) through (9), using the ideal sample values for $\hat{y}_b(k)$, where subscript b denotes the peak number. Table 2 gives relatively ideal sample values for $\hat{y}_b(k)$ at peak values for an EPR4 channel response (i.e., EPR4 ([5 5 −5 −5])), where each bit (row is spaced T apart in time. RRO detector 501 processes this sequence to detect the peak values such as given in Table 2.

TABLE 2

| Bits | Ideal Y |
|---|---|
| 0 | |
| 0 | |
| 1 | |
| 1 | 20 |
| 0 | |
| 0 | |
| 1 | |
| 1 | 20 |
| 1 | |
| 1 | |
| 0 | |
| 0 | −20 |
| 1 | |
| 1 | |
| 0 | |
| 0 | −20 |
| 0 | |
| 1 | |
| 1 | 20 |
| 1 | |
| 1 | |
| 0 | |
| 0 | −20 |

Figure 7:
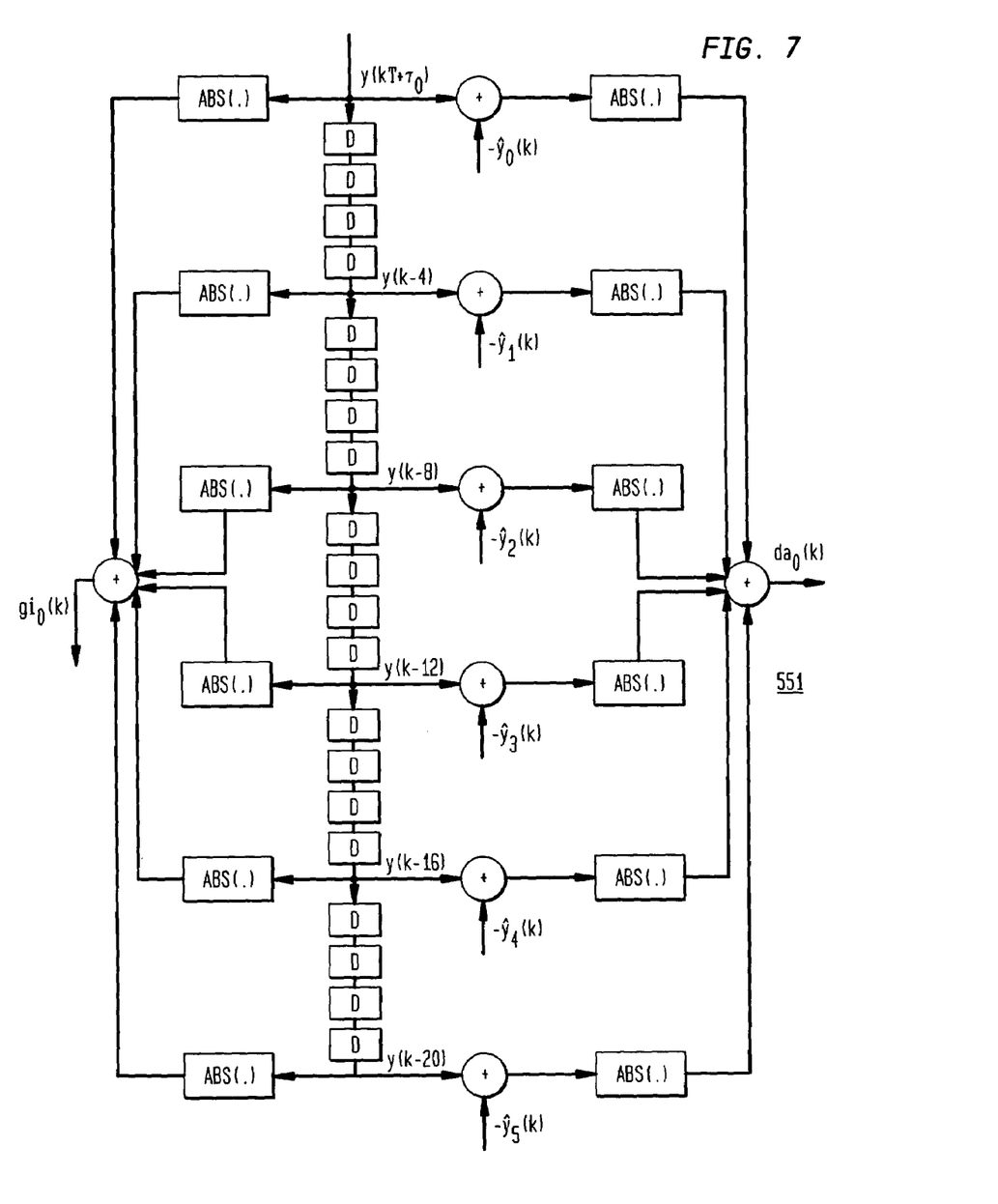
FIG. 7 shows an exemplary implementation of the absolute value distance module of FIG. 5.

RRO detector 501 comprises four absolute value distance (ABS) modules 551–554, minimum (MIN) calculator 555, threshold detector 556, delay 558, and decision logic 557. Each of ABS modules 551–554 implements the summed absolute value distance calculation for a corresponding sample sequence as given in equation (6). An implementation for sample sequence phase $\tau_0$ (e.g., the asynchronous sample sequence from A/D converter 511) is shown in FIG. 7 as ABS module 551; ABS modules 552–554 for interpolated sample sequences having phases $\tau_1$–$\tau_3$ may be implemented in a similar manner. In the figures, addition is shown by a "⊕" element (a combiner, e.g., as either an adder or a subtractor), absolute value is shown by an "ABS(●)" element, and delay "D" of one sample time is shown by a D element (e.g., a flip-flop).

Returning to FIG. 5, ABS modules 551–554 generate summed absolute value distances $da_0(k)$ through $da_3(k)$ for the four sample sequences, and MIN calculator 555 determines the minimum value of summed absolute value distances $da_0(k)$ through $da_3(k)$, implementing a calculation similar to that of equation (7). The minimum summed absolute value distance $da_0(k)$ through $da_3(k)$ is applied to threshold detector 556 to determine whether the minimum summed absolute value distances at time k is less than the threshold thr, implementing a calculation similar to that of equation (8). Delay 558 is employed to generate the minimum summed absolute value distance at time k−1. Decision logic 557 compares the minimum values at time k and k−1 to generate the RRO AM-found signal r(k) to indicate that the RRO AM is detected, implementing a calculation similar to that of equation (9). When the RRO AM found-signal r(k) indicates that the RRO AM is detected, the sample sequence having the phase $\tau_m$ corresponding to the minimum summed absolute value distance might correspond to the best phase (BP), and the corresponding best samples may be employed for RRO data detection and decoding by RRO data decoder 504.

While the present invention is described herein for selection of asynchronous or interpolated sample sequences using a distance metric such as absolute value distance, the present invention is not so limited. One skilled in the art might extend the teachings herein to receivers using squared Euclidean distance, or other types of distance metrics.

Gain Compensation

Gain compensation in accordance with exemplary embodiments of the present invention is now described. Gain compensation generates a gain adjustment value by monitoring a gain error measure, such as the sum of the absolute values of asynchronous samples from the A/D converter corresponding to one or more of the peaks of the RRO AM peak detection for one or more RRO AM peak detection events. The gain errors measured over many RRO AM peak detection events are combined to generate a median, average, weighted median, or weighted average value. The following embodiments are described for an average value, but may be readily extended to other combinations. For an ideal case in the example described previously, the average of the absolute sum of the 6 peak levels in the RRO AM field is 120 (20*6, from Table 2). This average 120 of the absolute sum is the ideal gain measure g_ideal; however, if the gain measure value is not equal to 120, then the asynchronous samples from the A/D converter might be adjusted through increased gain or attenuation. For the exemplary embodiment shown in FIG. 5, GAL 503 either multiplies (increases gain) or divides (attenuates) the asynchronous sample values for gain compensation. Other embodiments may adjust the analog signal prior to sampling and A/D conversion.

Each of ABS modules 551–554 generates gain error information in addition to the summed absolute value distance metric. The gain error information $gi_m(k)$ of the mth phase of sampling accounting for all B peaks spaced 4T apart is as given in equation (11):

$$gi_m(k) = \sum_{b=0}^{B-1} |y(kT + \tau_m - 4Tb)| \qquad (11)$$

which, as shown in FIG. 7 for the described example, ABS module 551 may generate for phase $\tau_0(m=0)$ when RRO detector 501 uses six peaks in the RRO AM field for detecting the RRO AM. One skilled in the art may extend the algorithm if peaks occur more or less than 4T apart.

Given the tentative RRO AM found signal t(k) (as described above with respect to equation (9)) and the gain error information $gi_m(k)$ for all phases m, gain compensation finds the maximum over m of the gain error information for every period T, which maximum is termed mgi(k). In FIG. 5, the maximum mgi(k) is generated by maximum (MAX) calculator 520 based on the values $gi_0(k)$ through $gi_3(k)$ from ABS modules 551–554.

The maximum gain error information values corresponding to each time a tentative address mark is found (i.e., when t(k) is 1) are recorded for L occurrences (L is a positive integer and may be programmable). For example, the maximum gain error information value for the current and the next two consecutive time periods might be recorded. Of these maximum gain error information values mgi(k) mgi(k+1), mgi(k+2), the maximum value bgi(k) of the maximum gain error information values is calculated, and maximum value bgi(k) may be termed the best gain error metric (BGEM). In FIG. 5, the BGEM bgi(k) is generated by BGEM calculator 521 using maximum gain error information values mgi(k), mgi(k+1) mgi(k+2) from MAX calculator 520. BGEM calculator 521 includes BEGM module 522 for calculating the maximum of values mgi(k), mgi(k+1) mgi(k+2), delays 531 and 532 to hold mgi(k+1) and mgi(k+2), and delays 533 and 534 to hold values of t(k) corresponding to mgi(k+1) and mgi(k+2).

Gain compensation in accordance with an exemplary embodiment of the present invention adjusts the gain of the asynchronous samples on an incremental basis in discrete steps. Gain compensation employs the actual gain error, g_error, to determine the direction (increase gain or attenuation) and the step size of the gain adjustment. Gain compensation employs upper and lower tolerances within which the actual gain error, g_error, should be maintained. The upper and lower tolerances may be specific for a given implementation, and may be determined through calculation and/or simulation. As would be apparent to one skilled in the art, other methods of gain compensation might be used that employ the actual gain error, g_error, such as by scaling the input samples by a value directly based on the value g_error.

Figure 8:
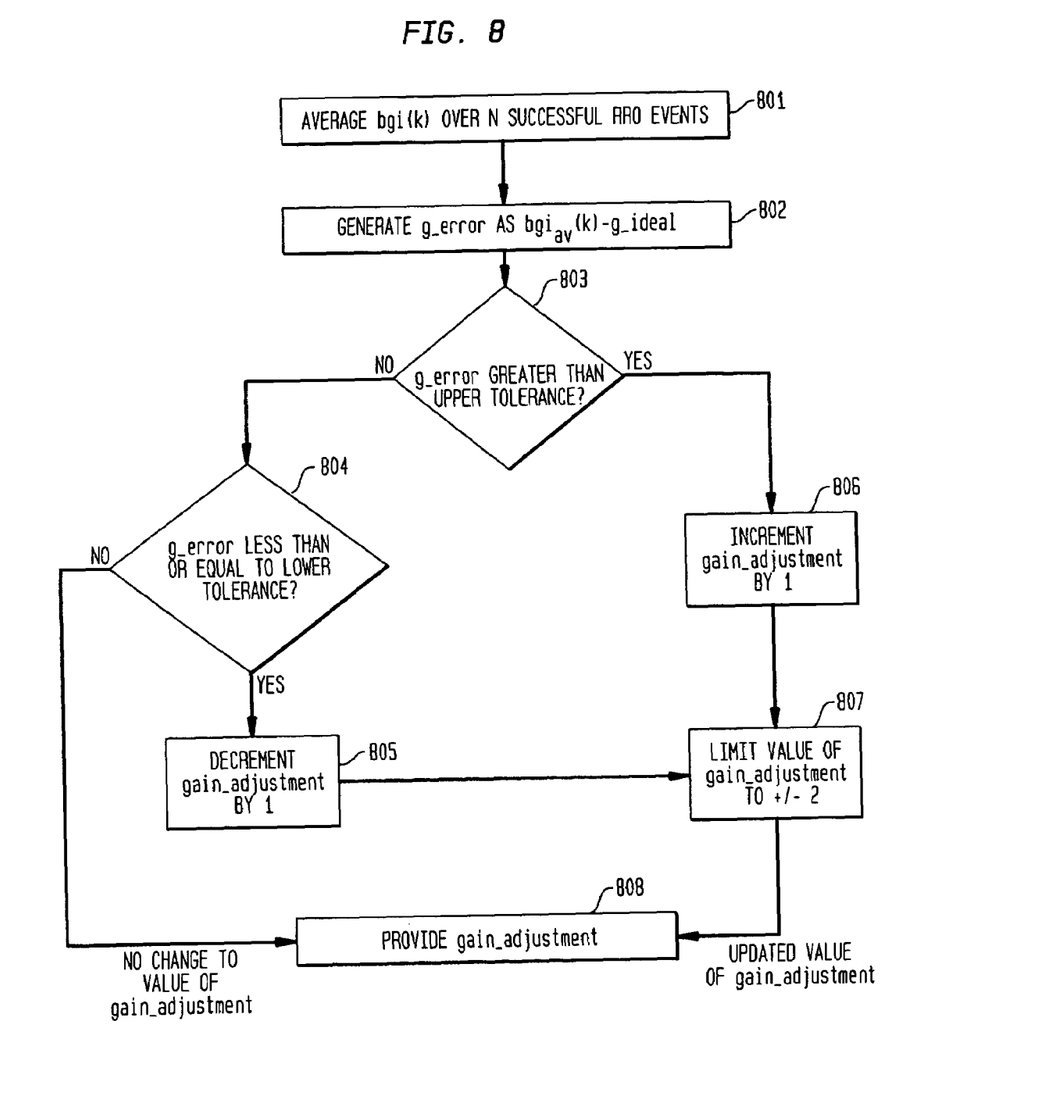
FIG. 8 shows an exemplary method of setting a gain adjustment value in accordance with an exemplary embodiment of the present invention.

Returning to FIG. 5, gain value logic 523 generates a gain adjustment (step) value gain_adjustment based on the actual gain error, g_error, which is derived, as described subsequently, from bgi(k) and the ideal gain measure g_ideal. The value gain_adjustment may be stored in a 2-bit register, which register is initialized at zero. FIG. 8 shows a method of generating a value for gain_adjustment as may be employed by gain value logic 523 of FIG. 5.

At step 801, the BGEM bgi(k) might be averaged over N successful RRO events (where N is a positive integer, may be predetermined off-line, and may be programmable) to provide $bgi_{av}(k)$. A successful RRO event is defined as an event where the RRO AM found signal r(k) is one (per equation (9) above). At step 802, given the average best gain error information metric $bgi_{av}(k)$, the actual gain error g_error is derived using the ideal gain measure, g_ideal given in equation (12):

$$g\_ideal = \sum_{b=0}^{B-1} |\hat{y}(kT - 4Tb)| \qquad (12)$$

where g_ideal is the absolute sum of the peak levels in the RRO AM field. The actual gain error, g_error, is the difference between bgi(k) and g_ideal (e.g., bgi(k)−g_ideal). For the described example of an EPR4 [1 2 0 −2 −1] target response, and the peak values spaced 4T apart as given in Table 2, g_ideal is 120.

At step 803, a test determines whether g_error is greater than the value of an upper tolerance. If the test of step 803 determines that the g_error is greater than the value of an upper tolerance, at step 806, the value of gain_adjustment is incremented by 1. At step 807, the value of gain_adjustment is limited to +/−2, which limitation may be employed to prevent over compensation of the gain. At step 808, the value of gain_adjustment is provided.

If the test of step 803 determines that the g_error is not greater than the value of an upper tolerance, at step 804, a test determines whether g_error is less than or equal to the value of a lower tolerance. If the test of step 804 determines that the g_error is less than or equal to the value of the lower tolerance, at step 805, the value of gain_adjustment is decremented by 1. From step 805, the method advances to step 807.

If the test of step 804 determines that g_error is greater than the value of the lower tolerance, the method advances to step 808, since the current, actual gain error is within the tolerance bounds.

The value of gain_adjustment is provided to, for example, GAL 503 (FIG. 5), which adjusts the value of the asynchronous samples. For the exemplary method of FIG. 8 and peak values of Table 2, Table 3 summarizes the adjustments made by GAL 503.

TABLE 3

| Value of gain_adjustment | Adjust Asynchronous Sample By: |
|---|---|
| −1 | Multiply by 1.125 |
| −2 | Multiply by 1.25 |
| 1 | Multiply by 0.875 |
| 2 | Multiply by 0.75 |

While the exemplary embodiments are described for samples spaced T/4 apart with a ¼ encoded RRO AM, the present invention is not so limited. One skilled in the art may modify the teachings herein for 1) any number of interpolators and 2) any RRO address mark pattern containing positive and negative peaks (e.g., a pattern characterized by transitions). In addition, while the present invention is described employing an EPR4 ([1 2 0 −2 −1]) target partial channel response with peak values of 20 and −20, the present invention is not so limited. One skilled in the art may extend the teachings herein to other target channel responses of different peak values.

A receiver employing one or more embodiments of the present invention may have substantially improved detection performance for asynchronously sampled servo RRO information. For some exemplary implementations, the receiver may experience greater than 2 dB improvement in RRO detection rate when compared to systems without gain error control. A receiver using digital interpolation and gain compensation replaces higher speed (and higher cost) sampling circuitry that may be employed to over-sample the analog signal while providing substantially equivalent or better performance.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. An apparatus for detecting data in a sample sequence read from a recording channel, the apparatus comprising:
   an interpolator adapted to generate one or more interpolated sample sequences from the read sample sequence, wherein each interpolated sample sequence has a different corresponding phase relative to the read sample sequence; and
   a detector adapted to:
   1) generate a distance measure between a portion of each sample sequence and an ideal sample sequence, wherein the ideal sample sequence corresponds to a sample sequence having peaks in the detected data,
   2) generate gain error information for the portion of each sample sequence,
   3) select either the read sample sequence or one of the interpolated sample sequences based on the minimum distance measures for use in detecting the data, and
   4) generating a best gain error metric (GEM) for the selected sample sequence from the corresponding gain error information; and
   gain adjustment logic adapted to adjust the read sample sequence based on the GEM.

2. The invention as recited in claim 1, wherein the gain adjustment logic is adapted to generate a gain adjustment value from the GEM.

3. The invention as recited in claim 2, wherein the gain adjustment logic includes a combiner adapted to adjust the read sample sequence based on the gain adjustment value.

4. The invention as recited in claim 1, wherein the GEM is the relative maximum value of gain error information for the portion of each sample sequence.

5. The invention as recited in claim 4, wherein a maximum of the gain error information is selected for a current time, and the maximum of the gain error information is selected for at least one subsequent time for other portions of each sample sequence, and wherein the detector sets the maximum of the gain error information for the current time or the subsequent time as the GEM.

6. The invention as recited in claim 1, wherein the gain adjustment logic is adapted to generate 1) an actual gain error based on the GEM and an ideal gain measure and 2) a gain adjustment value from the actual gain error.

7. The invention as recited in claim 6, wherein the gain logic generates the gain adjustment value based on a comparison of the actual gain error with i) an upper bound and ii) a lower bound.

8. The invention as recited in claim 6, wherein the gain logic generates the gain adjustment value based on the comparison of the actual gain error so as to adjust the gain adjustment value in discrete steps.

9. The invention as recited in claim 1, wherein the gain error information is the sum of the magnitudes of the samples corresponding to peaks in the detected data.

10. The invention as recited in claim 9, wherein the gain error information, $gi_m(k)$, at time k for the mth phase, $\tau_m$, of sample sequence accounting for all B peaks spaced $S_bT$ apart, $S_b$ a positive integer, is:

$$gi_m(k) = \sum_{b=0}^{B-1} |y(kT + \tau_m - S_bTb)|,$$

where $|\bullet|$ indicates "the absolute value of "$\bullet$".

11. The invention as recited in claim 1, wherein the data is servo data including an address mark and encoded data.

12. The invention as recited in claim 11, wherein the address mark is a repeatable run out (RRO) address mark and encoded data is encoded RRO data.

13. The invention as recited in claim 1, wherein the distance measure is an absolute value distance between the portion of each sample sequence and an ideal sample sequence.

14. The invention as recited in claim 13, wherein the detector is adapted to determine the minimum of the summed absolute value distance between the portion of each sample sequence and an ideal sample sequence.

15. The invention as recited in claim 14, wherein the detector determines the minimum of the summed absolute value distance $da_m(k)$ at time k as:

$$\min_{m,k} da_m(k) = \min_{m,k} \sum_{b=0}^{B-1} |y(kT + \tau_m - S_bTb) - \hat{y}(kT - S_bTb)|$$

where $y(\bullet)$ is either an observed sample or an interpolated sample, $\hat{y}(\bullet)$ is an ideal sample, B is a positive integer corresponding to a number of peaks, T is a symbol period, $S_i$ is a separation of the bth peak sample from the prior peak sample ($0 \leq b \leq B$), and $\tau_m$ is a phase of either the read sample sequence or one of the interpolated sample sequences (m an integer, $0 \leq m \leq M$, and M a positive integer corresponding to the number of sample sequences).

16. The invention as recited in claim 13, wherein the detector is further adapted to select the minimum of the summed absolute value distance when the minimum is less than a threshold value.

17. The invention as recited in claim 16, wherein the ML detector selects either the minimum of the summed absolute value distance for a current time k or for a previous time k-1.

18. The invention as recited in claim 16, wherein the threshold value is selected based on a probability of error of detection.

19. The invention as recited in claim 1, wherein the distance measure is a minimum distance.

20. The invention as recited in claim 19, wherein the minimum distance is either minimum squared Euclidean distance or minimum absolute value distance.

21. The invention as recited in claim 1, wherein the apparatus is embodied in an integrated circuit.

22. The invention as recited in claim 1, wherein the apparatus is implemented in a read channel component of either a magnetic recording system or an optical recording system.

23. A method of detecting data in a sample sequence read from a recording channel comprising the steps of:
(a) generating one or more interpolated sample sequences from the read sample sequence, wherein each interpolated sample sequence has a different corresponding phase relative to the read sample sequence;
(b) generating a distance measure between a portion of each sample sequence and an ideal sample sequence, wherein the ideal sample sequence corresponds to peaks in the data;
(c) generating gain error information for the portion of each sample sequence;
(d) selecting either the read sample sequence or one of the interpolated sample sequences based on the minimum distance measures for use in detecting the data;
(e) generating a gain error metric (GEM) for the selected sample sequence from the corresponding gain error information; and
(f) adjusting the read sample sequence based on the GEM.

24. The invention as recited in claim 23, wherein step (e) generates a gain adjustment value from the GEM.

25. The invention as recited in claim 24, wherein step (f) adjusts the read sample sequence based on the gain adjustment value.

26. The invention as recited in claim 23, wherein the GEM is the relative maximum value of gain error information for the portion of each sample sequence.

27. The invention as recited in claim 26, comprising the steps of selecting a maximum of the gain error information for a current time, selecting the maximum of the gain error information for at least one subsequent time for other portions of each sample sequence, and setting the maximum of the gain error information for the current time or the subsequent time as the GEM.

28. The invention as recited in claim 23, wherein step (e) comprises the steps of generating 1) an actual gain error based on the GEM and an ideal gain measure and 2) a gain adjustment value from the actual gain error.

29. The invention as recited in claim 28, wherein, for step (e), the gain adjustment value is generated by the step of comparing the actual gain error with i) an upper bound and ii) a lower bound.

30. The invention as recited in claim 28, wherein, for step (e), the gain adjustment value is generated by the step of comparing the actual gain error with i) an upper bound and ii) a lower bound so as to adjust the gain adjustment value in discrete steps.

31. The invention as recited in claim 23, wherein, for step (c), the gain error information is the sum of the magnitudes of the samples corresponding to peaks in the detected data.

32. The invention as recited in claim 31, wherein the gain error information, $gi_m(k)$, at time k for the mth phase, $\tau_m$, of sample sequence accounting for all B peaks spaced $S_bT$ apart, $S_b$ a positive integer, is:

$$gi_m(k) = \sum_{b=0}^{B-1} |y(kT + \tau_m - S_bTb)|,$$

where $|\bullet|$ indicates "the absolute value of "$\bullet$".

33. The invention as recited in claim 23, wherein, for step (d), the data is servo data including an address mark and encoded data.

34. The invention as recited in claim 33, wherein the address mark is a repeatable run out (RRO) address mark and encoded data is encoded RRO data.

35. The invention as recited in claim 23, wherein, for step (b), the distance measure is an absolute value distance between the portion of each sample sequence and an ideal sample sequence.

36. The invention as recited in claim 35, wherein step (b) comprises the step of determining the minimum of the summed absolute value distance between the portion of each sample sequence and an ideal sample sequence.

37. The invention as recited in claim 36, wherein step (b) comprises the step of determining the minimum of the summed absolute value distance $da_m(k)$ at time k as:

$$\min_{m,k} da_m(k) = \min_{m,k} \sum_{b=0}^{B-1} |y(kT + \tau_m - S_bTb) - \hat{y}(kT - S_bTb)|$$

where $y(\bullet)$ is either an observed sample or an interpolated sample, $\hat{y}(\bullet)$ is an ideal sample, B is a positive integer corresponding to a number of peaks, T is a symbol period, $S_b$ is a separation of the bth peak sample from the prior peak sample ($0 \leq b \leq B$), and $\tau_m$ is a phase of either the read sample sequence or one of the interpolated sample sequences (m an integer, $0 \leq m \leq M$, and M a positive integer corresponding to the number of sample sequences).

38. The invention as recited in claim 35, wherein, for step (d), the minimum of the summed absolute value distance is selected when the minimum is less than a threshold value.

39. The invention as recited in claim 38, wherein, for step (d), either the minimum of the summed absolute value distance for a current time k or for a previous time k−1 is selected.

40. The invention as recited in claim 38, wherein the threshold value is selected based on a probability of error of detection.

41. The invention as recited in claim 23, wherein, for step (b), the distance measure is a minimum distance.

42. The invention as recited in claim 41, wherein, for step (b), the minimum distance is either minimum squared Euclidean distance or minimum absolute value distance.

43. The invention as recited in claim 23, wherein the method is embodied by a processor of an integrated circuit.

44. The invention as recited in claim 23, wherein the method is implemented by a processor in a read channel component.

45. A computer-readable medium having stored thereon a plurality of instructions, the plurality of instructions including instructions which, when executed by a processor, cause the processor to implement a method for detecting data in a sample sequence read from a recording channel, the method comprising the steps of:

(a) generating one or more interpolated sample sequences from the read sample sequence, wherein each interpolated sample sequence has a different corresponding phase relative to the read sample sequence;

(b) generating a distance measure between a portion of each sample sequence and an ideal sample sequence, wherein the ideal sample sequence corresponds to peaks in the data;

(c) generating gain error information for the portion of each sample sequence;

(d) selecting either the read sample sequence or one of the interpolated sample sequences based on the minimum distance measures for use in detecting the data;

(e) generating a best gain error metric (GEM) for the selected sample sequence from the corresponding gain error information; and (f) adjusting the read sample sequence based on the GEM.

* * * * *